Figure 1:
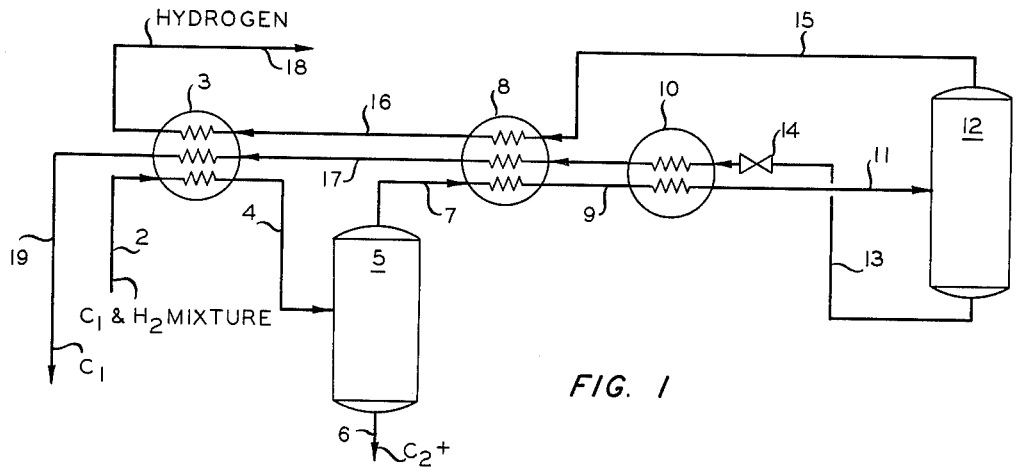

Dec. 14, 1965

J. W. DAVISON 3,223,745

PROCESS FOR DEALKYLATION AND RECOVERY
OF HYDROGEN FROM REFINERY GASES

Filed Jan. 2, 1962

INVENTOR.
J. W. DAVISON
BY
Young & Quigg
ATTORNEYS

3,223,745
PROCESS FOR DEALKYLATION AND RECOVERY OF HYDROGEN FROM REFINERY GASES
Joseph W. Davison, Bartlesville, Okla., assignor to Phillips Petroleum Company, a corporation of Delaware
Filed Jan. 2, 1962, Ser. No. 163,553
6 Claims. (Cl. 260—672)

This invention relates to the recovery of hydrogen from refinery gases. In one of its aspects, the invention relates to a process wherein a high-pressure refinery stream containing hydrogen and gaseous hydrocarbons is cooled by heat exchange until essentially all hydrocarbons heavier than methane have been liquefied, the liquefied hydrocarbons are removed from the process, the gaseous residue containing essentially any methane and hydrogen is further cooled until methane has been liquefied, methane is flashed to a lower pressure and used to cool the incoming refinery stream, the thus-purified hydrogen obtained is used without substantial pressure reduction to also cool the incoming feed. In another of its aspects, the invention relates to an apparatus which essentially comprises in combination, a heat-exchange zone means wherein indirect heat exchange is accomplished between a high-pressure refinery stream containing hydrogen and gaseous hydrocarbons, on the one-hand, and flashed liquefied methane and purified hydrogen on the other, means for separating as a liquid hydrocarbon heavier than methane from the thus-cooled feed, further heat-exchange means for heat-exchanging now-remaining gaseous feed and flashed liquefied methane, and purified hydrogen, means for separating from the further cooled remaining gaseous feed, liquefied methane, means for flashing the liquefied methane and using it as earlier described, means for recovering hydrogen and passing the same, without pressure reduction, to the heat exchanges in which it is employed, as herein described.

It has now been conceived by me that there can be operated a self-refrigerating system for the recovery of hydrogen from a mixture of gases containing the same, for example, high-pressure refinery gas streams, without the use of an expansion turbine or an external refrigeration cycle by contacting, by means of indirect exchange, the several streams which are prepared and used, as herein described. Thus, upon the cooling of the refinery gas stream, which is here used as an example, with expanded liquefied methane, on the one hand, and with purified hydrogen on the other, there can be obtained a liquefied hydrocarbon stream which is separated from the operation. Then, by further cooling the remaining refinery gases, still including hydrogen, by heat-exchange with purified hydrogen and expanded liquefied methane, there can be separated liquid methane which, when expanded, forms said expanded liquefied methane, on the one hand, and on the other, a high-pressure stream of purified hydrogen which then is used for heat exchange with the incoming feed or remaining component of the feed, as herein described.

It is an object of this invention to recover a purified hydrogen stream from a mixture of gases containing the same. It is another object of the invention to obtain purified hydrogen from a stream of refinery gases which are at a high pressure. It is a further object of the invention to recover purified hydrogen from a stream of gases containing the same without the use of an expansion zone or turbine or any external refrigeration cycle. It is still a further object of the invention to provide a self-refrigerating separation system suitable for the recovery of a substantially purified hydrogen gas from a mixture of gases containing the same.

Other aspects, objects and the several advantages of this invention are apparent from a study of this disclosure, the drawing and the claims. According to the present invention, which is now exemplified with respect to the recovery of hydrogen from a stream of high-pressure refinery gases containing the same and, also, containing hydrocarbons such as methane, ethane, ethylene, propane, propylene, butylene, butane, etc. or any one or more of these in admixture the refinery stream is heat-exchanged, as hereinafter described, to cool the same to liquefy hydrocarbons having two and higher numbers of carbon atoms, the liquefied hydrocarbons are separated in a phase separation zone and removed from the system, the now-remaining gases are further heat-exchanged, as hereinafter described, to cool and to, in part, liquefy the same to obtain liquefied methane, leaving hydrogen in the gaseous phase, the liquefied methane is expanded and the expanded liquefied methane is used for the heat exchanges described herein, the hydrogen remaining upon separation of the liquefied methane is then used also for the heat exchanges described herein, and is so used without substantial pressure reduction being practiced thereon.

Figure 2:
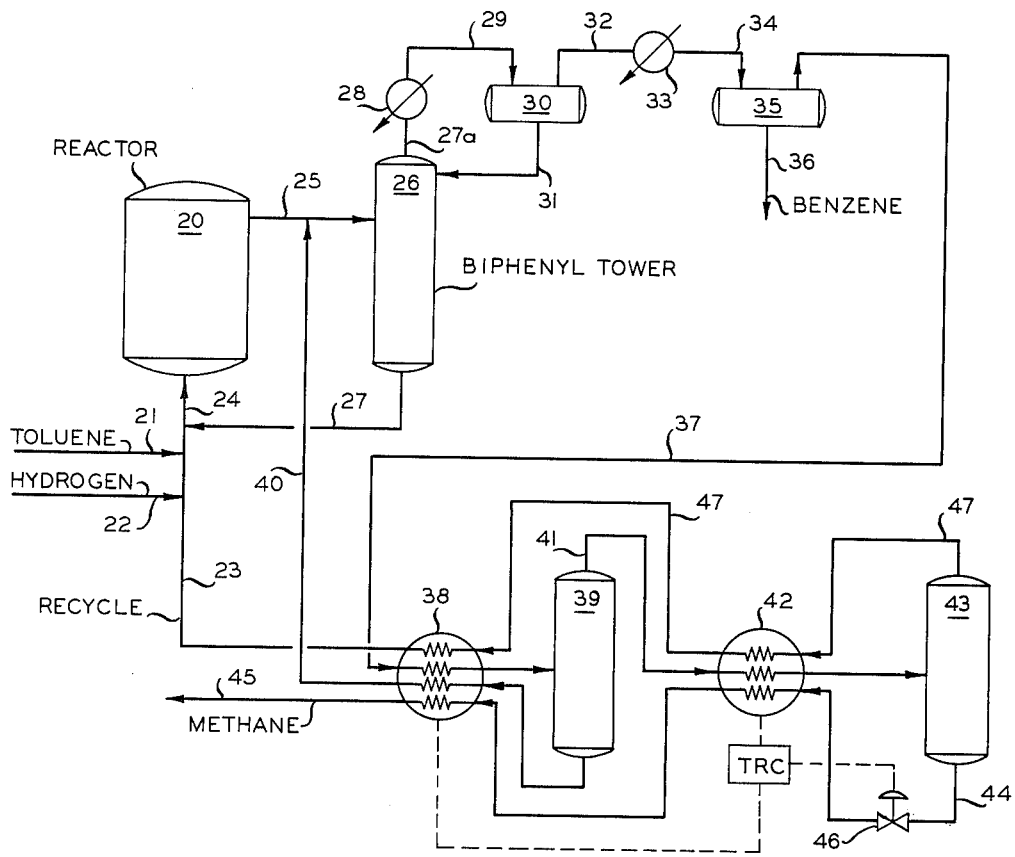

Referring now to the drawings, FIGURE 1 is a diagrammatic showing of an operation according to the invention and shows the respective heat exchange steps, as well as the separaton of methane and heavier hydrocarbons as liquid from hydrogen in high pressure separators. FIGURE 2 shows a somewhat modified operation according to the invention as it is adapted in a hydrodealkylation operation wherein toluene is hydrodealkylated to form benzene.

Referring now to FIGURE 1, a feed 2, containing essentially methane and hydrogen, but also containing some heavier hydrocarbons, is passed into heat exchanger 3, wherein the feed is sufficiently cooled to liquefy hydrocarbons which are heavier than methane. The feed is passed by 4 to phase separator 5, buttoms from which are essentially liquefied hydrocarbons higher-boiling than methane, which are separated from the system by 6. Remaining gaseous hydrocarbons passed by 7 into heat exchanger 8, and from heat exchanger 8 by 9 into heat exchanger 10. By now a substantial portion of methane has been liquefied and the thus-heat-exchanged gases and liquefied methane are passed by 11 to high pressure separator 12. Bottoms from high pressure separator 12 are passed by 13, pressure-reducing valve 14, into heat exchange zone 10 for heat exchange with the methane and hydrogen passing therethrough, as earlier described. Hydrogen which is separated in high pressure separator 12 is passed by 15 into heat exchanger 8, and this hydrogen and the expanded liquefied methane are used for supplying the refrigeration which is applied to the gas stream passing through heat exchanger 8, as earlier described. Further, the hydrogen passes from heat exchanger 8 by 16, and the expanded liquefied methane passes from heat exchanger 8 by 17 and both passed to heat exchanger 3 for heat exchange with the incoming gaseous mixture. Purified hydrogen is recovered at 18, and methane, which can be used as a fuel gas, is recovered at 19. Thus, it will be seen that according to the invention, hydrogen has been used without pressure reduction to provide the additional cooling, beyond that obtained with the expanded liquefied methane to make possible an operation in which no external refrigeration cycle is employed. Moreover, since the hydrogen is used at an elevated pressure, its recompression for use elsewhere, as now will be described, is not made necessary.

Referring now to FIGURE 2, reactor 20 receives toluene fed by 21 and hydrogen fed by 22 and by 23, by way of 24. Reactor 20 contains a suitable hydrodealkylation catalyst such as chromia-alumina, or the reactor may be a refractory lined vessel wherein thermal hydrodealkylation takes place.

Reactor 20 is operated at a temperature now preferred to be in the approximate range 800° F. to 1400° F. Effluent from reactor 20 passes by 25 into biphenyl tower 26, from which is separated, passes by 27 to 24 and thence to reactor 20 for further conversion to desired benzene. Overhead from biphenyl tower 26 passes by 27a, cooler 28, and 29, to reflux accumulator drum 30. Condensed liquid reflux is returned to tower 26 by way of 31, as reflux therefor. Non-condensed vapors and gases are passed by 32, cooler 33, and 34, to benzene accumulator 35, from which benzene product is withdrawn by 36. Lower-boiling hydrocarbons and hydrogen are passed by 37 to heat exchange zone 38. After heat exchange, the hydrocarbons are at a pressure of approximately 435 pounds per square inch absolute and a temperature of about 45° F. It will be seen that considerable condensation of hydrocarbons has occurred. The thus-cooled stream is passed to phase separator 39, from which the bottoms are passed by heat exchanger 38 and 40 to 25 and thence to biphenyl tower 26. Stream 40 contains a little benzene and some toluene. Overhead from separator 39 passes by 41 and heat exchanger 42 to phase separator 43. The pressure in this phase separator is approximately 430 pounds per square inch absolute and the temperature is such that bottoms therefrom contain a preponderant proportion of methane and a small amount of ethane and a still smaller amount of hydrogen. The bottoms are passed by 44, heat exchanger 42, and heat exchanger 38, and from the operation by 45. In heat exchangers 42 and 38, the bottoms from 43 which are expanded passing through valve 46 supply refrigerator to stream 37. The overhead stream contains a substantial amount of hydrogen, a lesser amount of methane, traces of ethane, and essentially no benzene and toluene, and is passed by 47, heat exchangers 42 and 38, as hydrogen recycle stream by 23 and 24 to reactor 20. It will be seen by one skilled in the art having studied this disclosure that there is provided a low temperature fractional condensation process for the recovery and recycle of hydrogen which has been substantially purified and from which a substantial quantity of hydrocarbons has been removed, and that the operation is feasible without pressure reduction upon the hydrogen which is reused as obtained, and without an external refrigeration cycle being required. Only a small pressure drop occurs as the hydrogen passes through heat exchangers and piping.

TABLE I

*Material balance*

FIGURE 2

[Stream flows given in moles per hour]

| Component | Stream | | | | |
|---|---|---|---|---|---|
| | 37 | 40 | 41 | 45 | 23 |
| Hydrogen | 822 | | 822 | 18 | 804 |
| Methane | 650 | | 650 | 516 | 134 |
| Ethane | 50 | | 50 | 50 | |
| Benzene | 48 | 48 | | | |
| Toluene | 2 | 2 | | | |
| Total | 1,572 | 50 | 1,522 | 584 | 938 |

Second stage separator temperature = −230° F.

In the case of the FIGURE 2 operation wherein there are two separation stages and wherein benzene is present, it is removed in the first stage separator to prevent freezing of the pipes at low temperatures encountered in the exchangers of the second stage separator.

It will be noted that all necessary cooling can be accomplished by throttling the liquid stream from the second stage separator 43 and exchanging this stream, together with the high pressure vapor recycle stream 47, against the feed stream 37.

It will be noted that in the operation of the invention, a stream rich in methane, 44, is obtained as a last liquid stream, which is then expanded and then used for heat exchange with the incoming flow of gases. The control to obtain suitable temperatures of the incoming stream, as it leaves heat exchangers 38 and 42, is accomplished by expansion zone 46, in this embodiment an expansion valve. It is within the scope of the invention to operate valve 46 responsive to the temperature at a selected point or points in heat exchanger 38 and/or heat exchanger 42. This is shown by a dotted line in FIGURE 2.

One skilled in the art in possession of this disclosure having studied the same will recognize that one of the important advantages of the scheme of operation is that hydrogen is recovered at an elevated pressure, making it readily reuseable as in a hydrodealkylation operation, as herein described, or for that matter, in other operations such as hydrocracking, hydrogenation, etc. which are well known oil refinery operations. Another advantage is that the operation is self-sustaining with respect to refrigeration requirements. Further, it can be shown that the operational scheme will work at pressures of from approximately 200 pounds per square inch up to about 900 pounds per square inch with optimum results now obtainable in the approximate range of 300 to 600 pounds per square inch. The key or important factor of the operation is that sufficient refrigeration is obtained by throttling the methane stream while maintaining the hydrogen product stream at high pressure.

Reasonable variation and modification are possible within the scope of the foregoing disclosure, drawing and appended claims to the invention, the essence of which is that a stream containing hydrogen and other gases, for example, hydrocarbon gases, is cooled by heat exchange, hydrocarbon gases heavier than methane are separated as a product of the operation, the remaining gases are further cooled until a liquefied methane stream is obtained, the liquefied methane stream is expanded and used for cooling of the incoming gases, a residual hydrogen stream is used, without pressure reduction thereon, also to cool or refrigerate the incoming gases, the operation being controlled, in a preferred form, by control of the degree of expansion practiced upon the liquefied methane stream; and that there has been provided an integrated hydrodealkylation operation in which, for example, toluene is hydrodealkylated to benzene and from which there is obtained by low temperature fractional condensation, without use from external refrigeration cycle or hydrogen expansion step, benzene, a methane fuel gas, and a hydrogen recycle stream for use in the hydrodealkylation reaction zone.

I claim:

1. A process for the separation and recovery of a purified hydrogen-containing gas stream at an elevated pressure of at least about 200 p.s.i.a. at which it is obtained from a mixture of gases containing the same together only with hydrocarbon, said process being self sustaining with respect to refrigeration requirements which comprises cooling such a stream maintained at said elevated pressure, separating a first liquid product therefrom containing hydrocarbons higher boiling than methane, further cooling the now-remaining gaseous stream to obtain a liquefied methane stream therefrom, expanding the liquefied methane stream and using the expanded stream as a refrigerant in the operation, and passing now-remaining gases containing essentially hydrogen, without substantial reduction of said elevated pressure into heat exchange with streams in the process to be cooled, thus obtaining said purified hydrogen substantially at said elevated pressure.

2. A hydrodealkylation operation wherein toluene is hydrodealkylated to produce benzene which comprises hydrodealkylating toluene in a hydrodealkylation reaction zone in the presence of hydrogen, recovering benzene from the reaction zone effluent, recovering a gaseous stream containing hydrogen, unreacted toluene, methane, ethane and some benzene and passing the same to a heat exchanger, therein cooling said stream to liquefy a portion thereof, separating as a liquid from said stream hydrocarbons boiling higher than methane, further cooling now-remaining gaseous stream to liquefy a substantial portion of methane therein contained, separating a liquefied methane stream from the thus-cooled remaining gases, expanding the liquefied methane stream and using the expanded liquefied methane stream to cool the incoming gases, as well as said remaining gases; recovering hydrogen-containing gases from the separation of the liquefied methane stream from the cooled remaining gases, and passing said hydrogen, without pressure reduction into heat exchange with the incoming gases and said remaining gases, and thence to said reaction zone as the hydrogen used in the hydrodealkylation operation effected in said reaction zone; and recovering methane from the operation.

3. An apparatus comprising in combination a first heat-exchange zone, a first separation zone, a second heat-exchange zone, and a second separation zone, means in said first heat-exchange zone for passing therethrough a feed stream to said first heat exchange zone, means communicating with said first separation zone for passing liquid therefrom through said first heat-exchange zone, means in communication with said first separation zone for passing vapors therefrom through said second heat-exchange zone, means in communication with said second separation zone to conduct thereto, vapors passed through said second heat-exchange zone from said first separation zone, means in combination with said second separation zone for removing liquid therefrom, and for expanding the same, means for passing the expanded liquid through said second and said first heat-exchange zones in the order named, and means upon said second separation zone for removing uncondensed material therefrom and passing the same directly and as obtained from said second separation zone through said second and said first heat-exchange zones, respectively, in the order named.

4. An apparatus according to claim 3 wherein at least one of said first and said second heat exchange zones is provided with a temperature-sensing means, said expansion zone is provided with control means, and wherein the temperature-sensing means is operatively connected to said expansion zone to control the same responsive to the sensed temperature of at least one of said first and said second heat-exchange zones.

5. An apparatus for the hydrodealkylation of toluene to benzene in the presence of hydrogen and which is suited to the recovery separately of hydrocarbons and biphenyl generated in the process and of hydrogen and to the reuse of said hydrogen and the conversion of said biphenyl to benzene, which comprises:
   (a) a dehydroalkylation reactor,
   (b) means to feed toluene and hydrogen to said reactor,
   (c) a biphenyl separation zone,
   (d) means to feed effluent from said reactor to said biphenyl separation zone,
   (e) means to feed biphenyl from said biphenyl separation zone to said reactor,
   (f) a benzene recovery means,
   (g) means to feed to said benzene recovery zone reaction effluent from which a substantial portion but not all of the biphenyl has been separated in said biphenyl separation zone,
   (h) means on said benzene separation zone to recover vapors containing biphenyl and benzene therefrom,
   (i) a first heat exchange zone,
   (j) a liquid hydrocarbon separation zone,
   (k) means to feed said vapors through said first heat exchange zone into said liquid hydrocarbon separation zone.
   (l) means for removing a separated liquid hydrocarbon stream containing biphenyl and benzene from said liquid hydrocarbon separation zone and passing said separated liquid hydrocarbon stream to said biphenyl separation zone, thus recovering both biphenyl and benzene,
   (m) a second heat exchange zone,
   (n) a second liquid hydrocarbon separation zone,
   (o) means for passing vaporous material containing hydrogen and methane through said second heat exchange zone into said second liquid hydrocarbon separation zone,
   (p) means for removing, expanding and passing into and through said second heat exchange zone and said first heat exchange zone, in the order named, a liquid methane-containing stream, recovering said methane as a product of the operation, and
   (q) means communicating with said second liquid hydrocarbon separation zone for recovering a hydrogen stream containing some methane and passing said hydrogen stream through said second and said first heat exchange zones, in the order named, and then into said reactor.

6. An apparatus according to claim 5 wherein at least one of said first and said second heat exchange zones is provided with a temperature-sensing means, said expansion zone is provided with control means, and wherein the temperature-sensing means is operatively connected to said expansion zone to control the same responsive to the sensed temperature of at least one of said first and said second heat exchange zones.

References Cited by the Examiner
UNITED STATES PATENTS

| | | | |
|---|---|---|---|
| 1,913,805 | 6/1933 | Hausen | 62—23 |
| 2,734,929 | 2/1956 | Doumani | 260—672 |

OTHER REFERENCES

Perry: "Chemical Engineer's Handbook," 3rd ed. (1950), published by McGraw-Hill (N.Y.), TP 155. P4. 1950, p. 1334.

ALPHONSO D. SULLIVAN, *Primary Examiner.*